Patented Dec. 12, 1922.

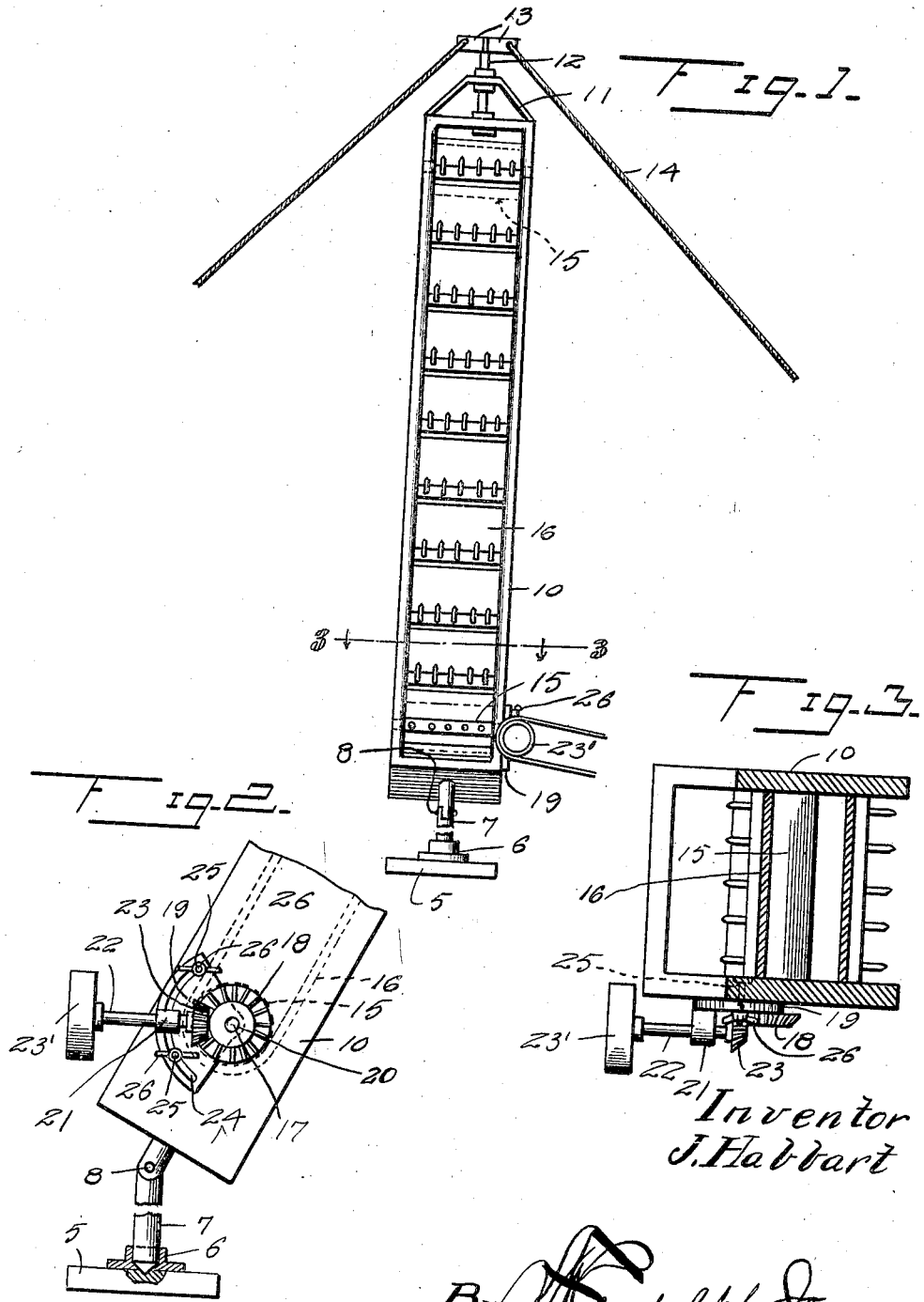

1,438,914

UNITED STATES PATENT OFFICE.

JOHN HABBART, OF PRAIRIE DU CHIEN, WISCONSIN.

CONVEYER.

Original application filed May 28, 1919, Serial No. 300,276. Divided and this application filed February 25, 1920. Serial No. 361,168.

*To all whom it may concern:*

Be it known that I, JOHN HABBART, a citizen of the United States, residing at Prairie du Chien, in the county of Crawford and State of Wisconsin, have invented certain new and useful Improvements in Conveyers; and I do hereby declare the following to be a full, clear, and exact description of the invention, such as will enable others skilled in the art to which it appertains to make and use the same.

My invention relates to conveyers and embraces the embodiment of the grain or hay stacker divided from my copending application filed May 28th, 1919, Serial Number 300,276 upon which Letters Patent No. 1,346,020 issued on July 6, 1920.

An important object of the invention resides in the provision of a conveyer which is so mounted as to permit the same to be moved to any point about a vertical axis and can be adjusted to any angle with respect to the vertical axis.

A further object of the invention resides in the provision of a conveyer particularly adapted for stacking hay and grain which may be conveniently placed in the field and which will be rigidly supported, the structure being such as to permit the conveyer to be readily adjusted upon both a vertical and horizontal axis, thus permitting the conveyer to be swung to a point in close proximity to the workmen where the conveyer will be loaded and the grain or hay carried to the stack.

Still another object of the invention resides in the provision of a grain or hay elevator or conveyer which may be disposed at any angle with respect to the perpendicular and which includes a novel adjustable mounting for the drive shaft of the conveyer whereby the drive shaft will at all times be disposed in a horizontal plane and yet permit the conveyer to be adjusted to any desired angle.

Another general object of the invention resides in the provision of a conveyer of the above stated character which is simple in construction, consists of few parts and may be manufactured and sold at a comparatively small cost.

With the above and other objects and advantages in mind, my invention consists in the novel combination of elements, construction and arrangement of parts, operations and specific features all of which to be hereinafter enlarged upon and explicitly defined in the subjoined claims, the invention being illustrated in the attached drawings, wherein:

Figure 1 is a front elevation of the conveyer in operative position;

Figure 2 is a fragmentary side elevation of the same, and

Figure 3 is a transverse sectional view taken on line 3—3 of Figure 1.

Referring in detail to the drawings wherein like characters of reference denote like parts in all the views, the numeral 5 designates a base which may be positioned in the field at any desired point and upon this base a vertically disposed bearing 6 is mounted in which is mounted a stub shaft 7, the latter being provided with a hinged joint 8 intermediate its ends.

The numeral 10 designates a rectangular conveyer frame, one end of which is rigidly mounted upon the upper end of the hinged stub shaft 7. By mounting the frame upon this hinged shaft it will be obvious that the frame may be swung to any angle with respect to the perpendicular and in order to retain the frame in supported position there is provided a substantially inverted U-shaped bracket 11 which is mounted upon the free end of the frame and extending through this bracket and the adjacent end of the frame is a rotatable stem 12 carrying a plurality of radially disposed arms 13 to which are attached guy ropes or cables 14 which are extended downwardly and attached to any suitable objects.

Journalled in the frame 10 adjacent the ends thereof are conveyer rollers 15 about which an endless conveyer apron 16 is engaged and which is movable between the parallel sides of the frame. The lowermost roller 15 is provided with an outstanding shaft or pintle 17 which extends through one of the side walls of the frame and projects outwardly beyond the same and fixed to rotate with this shaft or pintle is a pinion 18.

In order to provide a driving connection for the shaft or pintle 17 that will always be parallel to the drive element of a suitable power source regardless the degree of the angle of the conveyer frame, there is provided a segmental plate 19 which is provided with an opening 20 at its narrow end and which loosely receives the shaft or pintle 17, the segmental plate 19 being disposed between the pinion 18 and the adjacent wall of the frame 10. A laterally disposed sleeve or bearing 21 is formed upon the outer face of the plate 19 at its free end and in horizontal alignment with the shaft or pintle 17. A shaft 22 extends through this bearing 21 and carries a drive pinion 23 meshing with the pinion 18. The outer end of the drive shaft 22 carries a pulley wheel or other drive element 23' that is adapted to be operatively connected with any suitable source of power (not shown).

In order to permit the plate 19 to be adjusted about its axis after the conveyer frame is set at the proper angle, an arcuate slot 24 is provided at the free end of the plate and this slot receives outstanding bolts 25 carried by the adjacent wall of the frame upon which bolts are engaged wing nuts 26 which are threaded against the plate to lock the same in a position where the shaft 22 will be disposed in a horizontal plane.

In changing the degree of inclination of the conveyer frame the wing nuts 26 are first unloosened which will allow the bolts 25 to ride in the slot 24 to the proper position and the wing nuts then tightened against the plate to lock the same against movement.

The structure set forth is a practical embodiment of the invention but it will be stated that the invention may be embodied in other constructions and that my limits of such embodiments are only governed by what is claimed.

What is claimed is:—

1. A conveying mechanism including a conveyer structure, means to dispose said structure at different angles, a driving connection for said structure, and means mounting said driving connection on said structure independent of its support for adjustment relatively to the structure and to a distant source of power.

2. A conveying mechanism including a conveyer structure, means mounting said conveying structure at different angular positions, a driving connection for said structure, and means mounting said driving connection on said structure for adjustment in a substantially vertical plane independently of said mounting means and relatively to the structure and a distant source of power.

3. A conveying mechanism including a conveyer structure, means adjacent the base thereof mounting the same to assume different angular positions, supporting means for said structure at a distance above the base and having a swivel connection therewith, a driving connection on said structure independent of said first means and adjustable in a substantially vertical plane relatively thereto and to a distant source of power.

4. A conveying mechanism including a conveyer structure, means to dispose said structure at different angles, a shaft to actuate the structure, a plate capable of swivel movement on said shaft, a shaft for connection to a source of power journaled on said plate, and means to drive the first shaft from the second shaft.

5. A conveying mechanism including a conveyer structure, means to dispose said structure at different angles, a shaft to drive said structure, a gear wheel on said shaft, a plate for swivel movement on said shaft intermediate the structure and gear wheel, means to secure said plate in adjusted position, a shaft for connection to a source of power, the second shaft being journaled on said plate, and a gear wheel on said second shaft in mesh with the first mentioned gear wheel.

In testimony whereof I affix my signature in presence of two witnesses.

JOHN HABBART.

Witnesses:
 A. B. CURRAN,
 M. R. MUNSON.